United States Patent
Harathi et al.

(10) Patent No.: US 11,516,036 B1
(45) Date of Patent: Nov. 29, 2022

(54) SYSTEMS AND METHODS FOR ENHANCING MEETINGS

(71) Applicant: mmhmm inc., Little Rock, AR (US)

(72) Inventors: Ankith Harathi, Austin, TX (US); John Keck, Austin, TX (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/102,230

(22) Filed: Nov. 23, 2020

Related U.S. Application Data

(60) Provisional application No. 62/940,150, filed on Nov. 25, 2019.

(51) Int. Cl.
*G06F 15/16* (2006.01)
*H04L 12/18* (2006.01)
*G06Q 10/10* (2012.01)

(52) U.S. Cl.
CPC ..... *H04L 12/1831* (2013.01); *G06Q 10/1095* (2013.01); *H04L 12/1822* (2013.01)

(58) Field of Classification Search
CPC .. G06Q 10/10; G06Q 10/101; G06Q 10/1095; G06Q 30/02; G06Q 30/0203; G06Q 50/01; G09B 7/04; H04L 12/1818; H04L 12/1822; H04L 12/1831; H04L 51/32; H04L 65/403; H04L 67/02
See application file for complete search history.

(56) References Cited

U.S. PATENT DOCUMENTS

| | | | |
|---|---|---|---|
| 8,791,977 B2 | 7/2014 | Marvit | |
| 9,443,521 B1 * | 9/2016 | Olguin Olguin | ....... G10L 17/00 |
| 2012/0026277 A1 * | 2/2012 | Malzbender | ........... H04N 7/147 |
| | | | 348/E7.083 |
| 2014/0358632 A1 * | 12/2014 | Graff | .................. G06Q 30/0224 |
| | | | 705/7.29 |
| 2015/0213411 A1 * | 7/2015 | Swanson | .............. G06Q 10/103 |
| | | | 705/301 |
| 2016/0073054 A1 * | 3/2016 | Balasaygun | ........ H04L 12/1813 |
| | | | 348/14.08 |
| 2016/0117624 A1 | 4/2016 | Flores et al. | |
| 2018/0046957 A1 * | 2/2018 | Yaari | .................. G06Q 10/1095 |
| 2018/0160180 A1 * | 6/2018 | Kedenburg, III | .. H04N 21/4753 |
| 2018/0183844 A1 * | 6/2018 | Danker | ............. H04N 21/2187 |
| 2018/0308113 A1 * | 10/2018 | Kopikare | ........... G06Q 10/1095 |
| 2019/0349212 A1 * | 11/2019 | Heins | .................. H04L 12/1831 |
| 2021/0185276 A1 * | 6/2021 | Peters | .................... G06V 20/41 |

FOREIGN PATENT DOCUMENTS

WO    WO-2020214316 A1    10/2020

* cited by examiner

*Primary Examiner* — Farzana B Huq
(74) *Attorney, Agent, or Firm* — Muirhead and Saturnelli, LLC

(57) ABSTRACT

The present disclosure provides methods and systems for quantifying meeting effectiveness. A method for quantifying meeting effectiveness may comprise: (a) receiving calendar data related to a meeting; (b) generating a feedback survey based on the calendar data for collecting user feedback data, wherein the feedback survey is presented to a user on an electronic device; (c) generating, using a trained machine learning algorithm, a meeting score indicative of an effectiveness of the meeting based on the meeting data and the user feedback data, and (d) displaying the meeting score within a graphical user interface (GUI) on the electronic device.

25 Claims, 10 Drawing Sheets

*FIG. 5A*

How'd you feel about the Weekly Sprint Planning meeting?

So you're saying it felt a lot like... (378 kB) *

[ ] [ ] [ ] [ ] [ ] [Other]

I didn't need to be there

Didn't need to be a meeting

Better agenda/prep

Clearer next steps

Not enough voices heard

Not seeing what you want?

[See your team's reactions]

Marlo Tech Talks

Thank you for responding!

Your opinions are being used to make meetings better every day.

Click for detailed results

Have more to say? Feel free to type any additional thoughts below.

*FIG. 6*

SYSTEMS AND METHODS FOR ENHANCING MEETINGS

CROSS-REFERENCE TO RELATED APPLICATIONS

This application claims the priority and benefit of U.S. Provisional Application No. 62/940,150, filed on Nov. 25, 2019, the entirety of which is incorporated herein by reference.

BACKGROUND

Meetings may be unproductive or ineffective. Unproductive meetings may be costly and a waste of time. For example, statistics show that unproductive meetings cost companies and individuals over $37 billion per year.

SUMMARY

The present disclosure provides methods and systems for quantitatively and qualitatively measuring the effectiveness of meetings. Methods and systems of the present disclosure may be capable of evaluating the effectiveness of meetings in a quantitative manner by calculating a meeting score standardized across meetings, groups, departments, companies, or other levels of organizations. Methods and systems provided herein may dynamically generate feedback surveys personalized for each individual meeting for collecting feedback data which is further used for calculating the meeting score. Methods and systems of the present disclosure may be implemented on or seamlessly integrated into a variety of platforms, including existing meeting platforms and/or meeting software. Methods and systems provided herein may dynamically modify the interface or appearance of existing meeting software or provide a standalone software to display processed and analyzed meeting and/or calendar data to help inform of the meetings effectiveness in real time.

The present disclosure provides systems and methods for measuring meeting effectiveness. Meeting effectiveness score can be used to generate recommendations for future meetings or to modify or create a meeting software during the course of a meeting to improve interactions and conversations during that meeting. Systems and methods of the present disclosure may utilize supervised learning, unsupervised learning or semi-supervised learning for generating quantitative and qualitative analysis of meeting effectiveness and/or generating recommendations in an automated fashion. The provided methods and systems may be capable of accounting for the variability among meetings (e.g., different meeting profiles). In some cases, the meeting effectiveness quantification algorithm may continually improve to provide personalized recommendations based on feedback data or meeting data.

In an aspect, a method for quantifying meeting effectiveness is provided. The method may comprise: (a) receiving calendar data related to a meeting; (b) generating a feedback survey based on the calendar data for collecting user feedback data, in which the feedback survey is presented to at least one or more participants in the meeting; (c) generating, using a trained machine learning algorithm, a meeting score indicative of an effectiveness of the meeting based on the meeting data and the user feedback data, and (d) displaying the meeting score within a graphical user interface (GUI) on the electronic device.

In a related yet separate aspect, a system for quantifying meeting effectiveness is provided. The system comprises a computer comprising one or more computer processors that are individually or collectively programmed to: receive calendar data and meeting data related to a meeting; generate a feedback survey based on the calendar data for collecting user feedback data, wherein the feedback survey is presented to at least one or more participants in the meeting; generate, using a machine learning algorithm trained model, a meeting score indicative of an effectiveness of the meeting based on the meeting data and the user feedback data; and display the meeting score within a graphical user interface (GUI) on an electronic device.

In a further related yet separate aspect, a non-transitory computer-readable medium comprising machine-executable instructions that, upon execution by one or more computer processors, implements a method for visualizing digital content of a web-based application. The method comprises: receiving calendar data and meeting data related to a meeting; generating a feedback survey based on the calendar data for collecting user feedback data, wherein the feedback survey is presented to at least one or more participants in the meeting; generating, using a machine learning algorithm trained model, a meeting score indicative of an effectiveness of the meeting based on the meeting data and the user feedback data; and displaying the meeting score within a graphical user interface (GUI) on an electronic device.

In some embodiments, the calendar data comprises calendar metadata. In some embodiments, a content of the feedback survey or a timing of presenting the feedback survey on the user device is determined based on the calendar metadata. In some cases, the content of the feedback survey comprises one or more questions related to a comment about the meeting and options corresponding to at least one question, wherein the options are generated based at least in part on the meeting. In some embodiments, at least a portion of the meeting data is captured by the electronic device. In some embodiments, the meeting data comprises audio data, video data or chat messages. In some embodiments, the user feedback data is provided by the at least one or more participants via the GUI on the electronic device.

In some embodiments, the method further comprises displaying a recommendation on improving the meeting score within the GUI. In some cases, the recommendations are generated using the trained machine learning algorithm. In some cases, the recommendation comprises a recommended meeting size, recommended meeting attendees, a recommended meeting duration, a recommended meeting location, recommended meeting keywords, recommended meeting deliverables, or a recommended meeting agenda.

In some embodiments, the method further comprises providing real-time meeting effectiveness information during the meeting. In some cases, the method further comprises generating one or more visual indicators indicative of the real-time meeting effectiveness information based at least in part on a real-time meeting data stream or the calendar data. In some cases, the method further comprises presenting the one or more visual indicators on a GUI of the meeting. In some cases, the one or more visual indicators comprise a distribution of speaking time among a plurality of participants of the meeting. In some cases, the method further comprises rearranging a plurality of graphical representations of the plurality of participants according to the one or more visual indicators. In some cases, the one or more visual indicators comprise an indication of an interruption of speaking during the meeting. In some cases, the one or more visual indicators comprise a remaining time of the meeting.

In some instances, the remaining time of the meeting is estimated based at least in part on the calendar data.

In another aspect, a method for providing real-time meeting effectiveness information is provided. The method comprises: receiving a meeting data stream and calendar data related to a meeting; generating one or more visual indicators indicative of the meeting effectiveness base at least in part on the meeting data stream and calendar data; and presenting the one or more visual indicators on a GUI of the meeting.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 5A and FIG. 5B show examples of GUIs for presenting feedback surveys and receiving user feedback.

FIG. 6 shows an example of a GUI for a user to provide user feedback.

DETAILED DESCRIPTION

Figure 1:
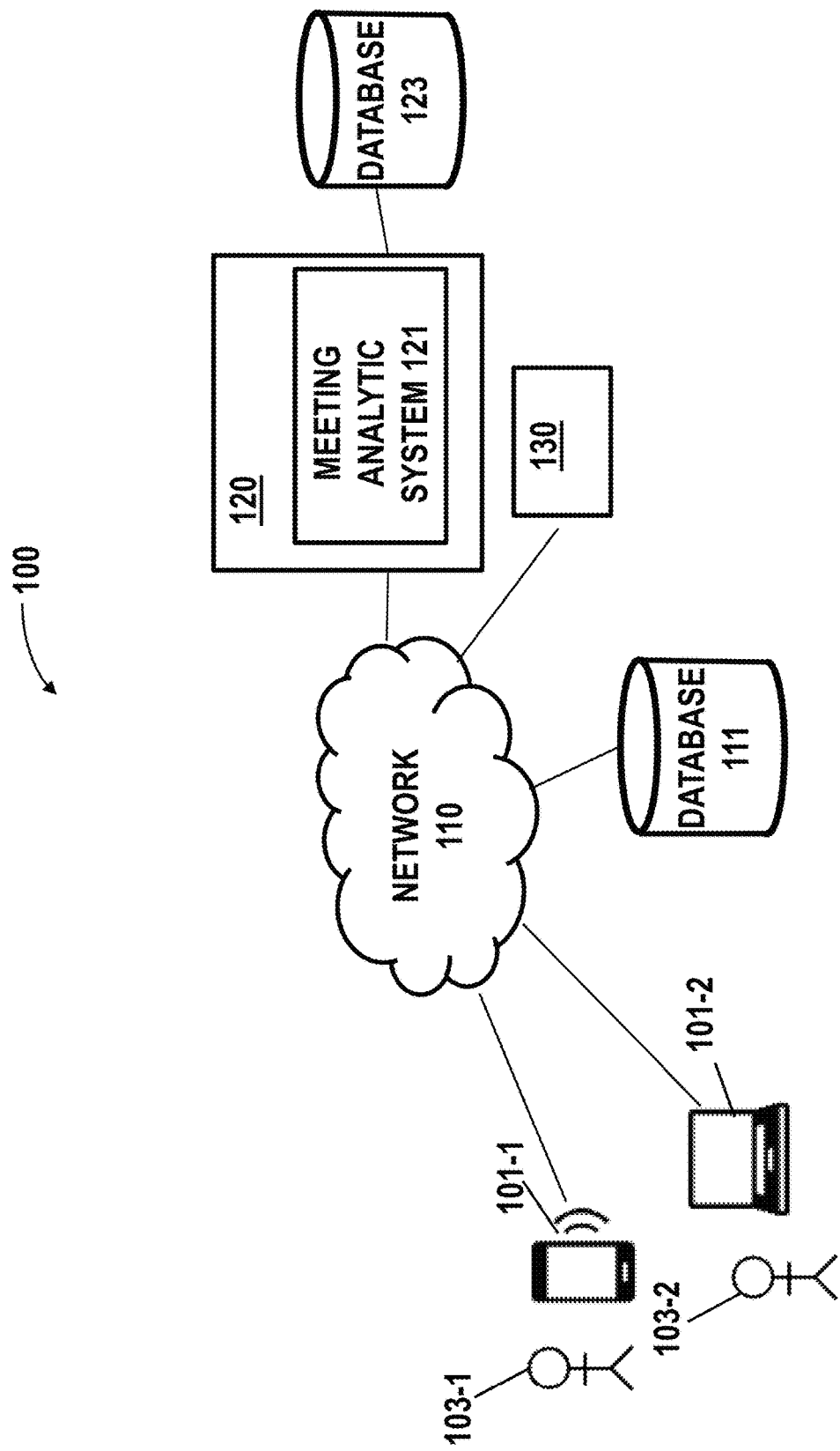
FIG. 1 schematically shows a platform in which the method and system for providing meeting analytics can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "meeting profile" as used herein, generally refers to a collection of characteristics of a meeting. Such characteristics may comprise, for example, size and composition of a meeting (e.g., number of participants/attendees, roles of participants in the meeting), meeting duration, meeting location, meeting keywords, meeting deliverables or a meeting agenda.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems and methods that may provide standardized meeting effectiveness assessment cross a variety of meetings. Systems and methods of the present disclosure may provide a platform for personalized recommendations that can adapt to an individual meeting. In some cases, the platform may calculate meeting effectiveness metrics using meeting data collected from existing meeting platform or devices without additional device setup or cost. The physical system for collecting the meeting data may need not be the same. For example, different meetings may have different forms/types such as telework, telecommuting, face-to-face, and virtual meetings such that the types of data collected for each meeting may be different.

The meeting data may be in the form of audio data, video data, textual data, and graphical data. The type of meeting data may be dependent on the meeting platform or the forms of meetings. For example, the meeting data may include chat messages submitted via a meeting software application. In another example, the meeting data may include a photo of a whiteboard or a scanned image of meeting notes for a face-to-face meeting. The meeting data may comprise time-series data such as audio streams or video streams. The meeting data may comprise static data such as photos, images, chat messages and other data captured by the meeting capturing device, user device and/or the third-party meeting system. The provided method and algorithms can be applied regardless of the physical meeting platforms of implementation. For instance, methods and algorithms of the present disclosure may be implemented on physical systems having different hardware components (e.g., types of sensors and devices, number of sensors and devices), architectures, computing environment, programming language and the like.

The provided meeting analytic system may provide a predictive model for generating a meeting score or personalized recommendations. A predictive model may be a trained model or trained machine learning algorithm. The personalized predictive model may be improved or optimized continuously using private data collected. In some cases, the input data to the predictive model may comprise user feedback and meeting data. In some cases, the user feedback may be used as labeled data for continual training to further contribute to the practicality of the approach. In some cases, the user feedback may be collected by generating a personalized feedback survey. In some cases, the feedback survey related to a given meeting may be generated based on calendar metadata associated with the meeting.

The output of the predictive model may comprise a meeting score that is standardized across meetings, groups, departments, companies, or other level of organizations. The meeting scores may be associated with measurement of the meeting effectiveness metrics. The meeting scores may show users how the meeting effectiveness metrics compare with the averages. For example, the meeting score can be any number from 0 to 100 with higher value indicating more effective and more productive. For instance, a meeting score of >70 indicates a world class effectiveness, a meeting score between 40 and 70 indicates generally good effectiveness with some tangible ways to be better and a meeting score of below 40 indicates a meeting needs significant improvement. The meeting score can be represented in any suitable format, such as, numerical and graphical, continuous or discrete level.

The output of the predictive model may comprise recommendation information. The recommendation information may comprise information about changing one or more meeting characteristics as described above. For example, the recommendation may comprise a recommended size of meeting, composition of a meeting (e.g., number of participants/attendees, roles of participants in the meeting), meeting duration, meeting location, meeting keywords, meeting deliverables or a meeting agenda or other recommendations that may influence the effectiveness or meeting score. In some cases, the recommendations may be personalized so that one or more actions as recommended are executable. For example, the one or more actions may include actions to reduce the instances of participants speaking over each other during a meeting or allocate airtime to every participant.

The term "labeled data" or "labeled dataset," as used herein, generally refers to a paired dataset used for training a model using supervised learning. Methods provided herein may utilize an un-paired training approach allowing a machine learning method to train and apply on existing datasets that may be available with an existing physical meeting system.

The system may calculate a meeting score which provides a simple and standardized way for users to view the effectiveness of a meeting. The meeting scores may be associated with measurement of the meeting effectiveness metrics. The meeting scores may show users how the meeting effectiveness metrics compare with the averages. In some cases, the meeting score may be presented with insight and recommendations of executable actions for future meetings.

FIG. 1 schematically shows a platform 100 in which the method and system for providing meeting analytics can be implemented. A platform 100 may include one or more user devices 101-1, 101-2, a server 120, a meeting analytic system 121, one or more third-party meeting systems 130, and a database 111, 123. The platform 100 may optionally comprise meeting capturing devices for capturing meeting data. Each of the components 101-1, 101-2, 111, 123, 120, 130 may be operatively connected to one another via a network 110 or any type of communication link that allows transmission of data from one component to another.

The meeting analytic system 121 may be configured to train one or more predictive models for analyzing input data (e.g., meeting data) transmitted from the user device 101-1, 101-2, and/or a third-party meeting system 130, generate personalized feedback survey, calculate a meeting effectiveness metric (e.g., meeting score), and/or provide recommendation information. As described above, the recommendation information may comprise information about changing one or more meeting characteristics. For example, the recommendation may comprise a recommended size of meeting, composition of a meeting (e.g., number of participants/attendees, roles of participants in the meeting), meeting duration, meeting location, meeting keywords, meeting deliverables or a meeting agenda, or other recommendations that may influence the effectiveness or meeting score. In some cases, the recommendations may be personalized so that one or more actions as recommended are executable. For example, the one or more actions may include actions to reduce the instances of participants speaking over each other during a meeting or allocate airtime to every participant such that by performing these one or more actions, the meeting score can be improved.

Figure 3:
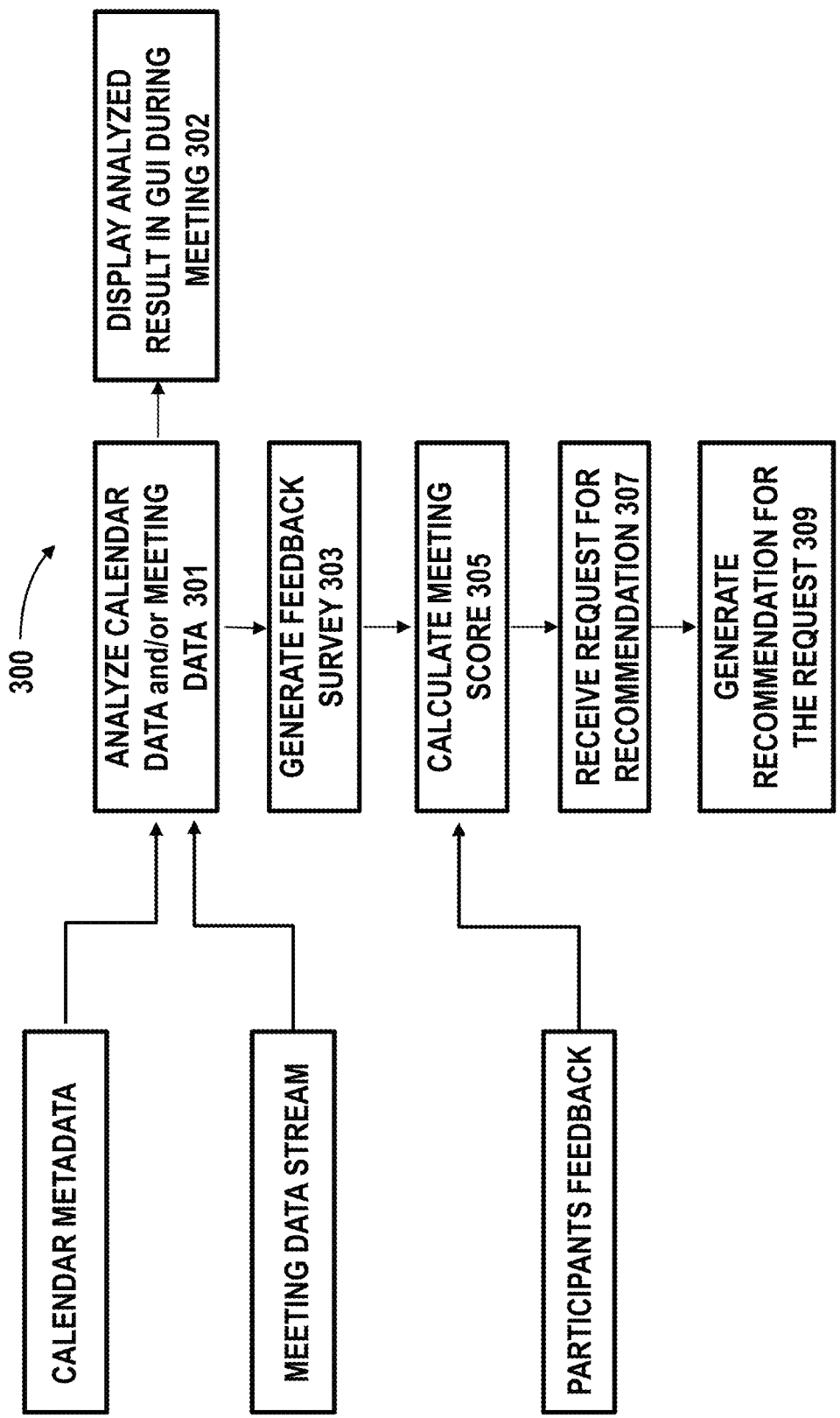
FIG. 3 shows an example of a method for providing meeting effectiveness assessment and recommendations.

The meeting analytic system 121 may be configured to perform one or more operations consistent with the disclosed methods described with respect to FIG. 3. In some cases, the meeting analytic system may be configured to generate a personalized feedback survey to be presented to the participants based on calendar data. In some cases, participants/users feedback may be collected and used along with meeting data to generate a meeting score. The meeting analytic system may be implemented anywhere within the platform, and/or outside of the platform 100. In some embodiments, the meeting analytic system may be implemented on the server. In other embodiments, a portion of the meeting analytic system may be implemented on the user device. Additionally, a portion of the meeting analytic system may be implemented on the third-party meeting system. Alternatively or in addition to, a portion of the meeting analytic system may be implemented in one or more databases 111, 123. The meeting analytic system may be implemented using software, hardware, or a combination of software and hardware in one or more of the above-mentioned components within the platform. Details about the meeting analytic system are described later herein.

In some embodiments, a user 103-1, 103-2 may be associated with one or more user devices 101-1, 101-2. In some cases, a user may attend a meeting using a user device. For example, the user 103-1 may attend a virtual meeting via a meeting software running on the user device 101-1. The meeting software may be provided by a third-party meeting system 130. Alternatively, the meeting may be a face-to-face meeting that the users/participants may not need the user device for attending the meeting. In some cases, a user may be presented a feedback survey about the meeting via the user device. For example, feedback survey generated by the meeting analytic system 121 may be displayed to the user on a display of the user device and the user may provide feedback data via the user device.

User device 101-1, 101-2 may be a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device capable of analyzing, receiving (e.g., receiving user input as meeting feedback data), providing or displaying certain types of data (e.g., survey or questionnaire about the meeting, meeting score, recommendation, etc.) to a user. The user device may be a handheld object. The user device may be portable. The user device may be carried by a human user. In some cases, the user device may be located remotely from a human user, and the user can control the user device using wireless and/or wired communications. The user device can be any electronic device with a display.

User device 101-1, 101-2 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications (e.g., provided by third-party meeting server 130) that allow the user to participate a meeting via the software application, and/or software applications provided by the meeting analytic system 121 that allow the user device to communicate with and transfer data between server 120, the meeting analytic system 121, and/or database 111.

The user device 101-1, 101-2 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User device 101-1, 101-2 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show meeting score, recommendation and images, charts, interactive elements relating to a meeting (e.g., meeting statistics, participant feedback, etc). The GUI may display a meeting survey and permit a user to input user feedback (e.g., select an answer, enter an evaluation, etc). The user device may also be configured to display webpages and/or websites on the Internet. One or more of the webpages/websites may be hosted by server 120 and/or rendered by the meeting analytic system 121.

In some cases, at least a portion of the meeting data may be collected by a meeting capturing device. The meeting capturing device may comprise sensors such as camera, audio sensors (e.g., microphones) for recording a meeting and/or computing devices for capturing other meeting data such as textual data, chat messages, and the like. The meeting capturing device may be part of the user device 101-1, 101-2 or separate from the user device. For example, the meeting capturing device may be a camera disposed in an indoor room of a building in which the meeting is conducted. Alternatively or in addition to, the meeting capturing device may be built-in webcam on the user device. Any description herein relating to sensor(s) or software applications for capturing meeting data on the user device can also be applied to the meeting capturing device.

In some embodiments, users may utilize the user devices to interact with the meeting analytic system 121 by way of one or more software applications (i.e., client software) running on and/or accessed by the user devices, wherein the user devices and the meeting analytic system 121 may form a client-server relationship. For example, the user devices may run dedicated mobile applications or software applications for viewing meeting effectiveness assessment (e.g., meeting score, meeting statistics, etc) and recommendation provided by the meeting analytic system. The software applications for conducting a meeting and viewing effectiveness assessment of the meeting may be different applications. The meeting analytic system may deliver information and content to the user devices 103 related to a meeting analytic result (e.g., a meeting score, recommendations and meeting statistics, feedback survey about a meeting) and various others, for example, by way of one or more web pages or pages/views of a mobile application. Alternatively or in addition to, meeting effectiveness assessment and recommendation provided by the meeting analytic system may be integrated into a third-party user interface such as APIs integrated to an existing software application such that the meeting score, recommendation, or survey may be displayed within a GUI rendered by the third-party meeting system 130. The third-party user interfaces may be hosted by a third-party server. Alternatively or in addition to, the meeting effectiveness assessment and recommendations provided by the meeting analytic system may be provided as a standalone software application or can be accessed independent of the third-party meeting software application.

In some embodiments, a feedback survey personalized to a meeting, a group of participants or an individual participant may be automatically generated and delivered to the participants without user interference. Such feedback survey may be delivered to the user via any suitable approach. The feedback survey may be delivered through the user device 101-1, 101-2, or any device that is capable of providing a user interface.

In some embodiments, the feedback survey, meeting effectiveness assessment and/or recommendation(s) may be presented to the user via a graphical user interface (GUI) or webhooks that can be integrated into other applications, or via any suitable communication channels (e.g., email, Slack, SMS). A user may provide user feedback via the GUI. The user feedback may be provided through the user device, or any device that is capable of receiving an input. For example, the user feedback may be provided via the graphical user interface (GUI), webhooks that can be integrated into other applications, or via any suitable communication channels (e.g., email, Slack, SMS). In some embodiments, the user feedback may be provided via a user interface (UI). The UI may include a UI for representing feedback survey generated by the meeting analytic system to the user and receiving user input from a user (e.g., through user device). The user interface may comprise using of one or more user interactive device (e.g., mouse, joystick, keyboard, trackball, touchpad, button, verbal commands, gesture-recognition, attitude sensor, thermal sensor, touch-capacitive sensors, AR or VR devices). In some cases, the UI may comprise a GUI for displaying feedback survey and receiving user feedback, and a separate GUI for users to view meeting effectiveness assessment and/or recommendation(s) generated by the meeting analytic system.

In some embodiments, the provided platform may generate one or more graphical user interfaces (GUIs). The GUIs may be rendered on a display screen on a user device (e.g., a participant device). A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices (e.g., smart phones, cell phones, personal digital assistants (PDAs), and tablets), and wearable devices (e.g., smartwatches, etc)).

In some embodiments, a user 103-1, 103-2 (e.g., participant) may be associated with one or more meeting capturing device such as camera, audio sensors (e.g., microphones) for recording a meeting and/or computing devices for capturing other form of meeting data such as textual data, chat messages, and the like. The meeting capturing device may be in communication with the third-party meeting system 130 and/or the meeting analytic system 121.

A physical system or physical platform as described herein may comprise the user device and the meeting capturing device. In some cases, the platform 100 may provide meeting effectiveness assessment and recommendation using data collected from the existing devices without extra device setup or cost. The physical system associated with each meeting may need not be the same. For example, different meetings may be associated with different types/number of user devices or meeting capturing devices such that the types of data collected for each meeting may be different. In some cases, the provided method and effectiveness quantification algorithms can be applied regardless of the meeting systems of implementation. For instance, methods and algorithms of the present disclosure may be implemented on different meeting systems having different hardware components (e.g., camera, speaker, etc), software applications, architectures, computing environment, programming language and the like.

Server 120 may be one or more server computers configured to perform one or more operations consistent with the disclosed embodiments. In one aspect, the server may be implemented as a single computer, through which user device, third-party meeting system 130 are able to communicate with the meeting analytic system 121 and database. In some embodiments, the user device, third-party system 130, or meeting capturing device communicate with the meeting analytic system 121 directly through the network. In some embodiments, the server may embody the functionality of one or more of the meeting analytic systems. In some embodiments, one or more meeting analytic systems may be implemented inside and/or outside of the server. For example, the meeting analytic systems may be software and/or hardware components included with the server or remote from the server.

The third-party meeting system 130 can be any existing meeting platform that provides tools for facilitating various tasks related to meetings. For example, the third-party meeting system may provide software applications to assist scheduling meetings, such as determining logistics (e.g., when, where), identifying who should attend, and developing an agenda or another such document to guide the flow and/or discussion of the meeting, or software applications for conducting meetings such as capturing meeting minutes, action items, and deliverable items. In some cases, the third-party meeting system may be in direct communication with the meeting analytic system such that the meeting data collected by the third-party meeting system may be accessible to the meeting analytic system for meeting effectiveness assessment.

In some embodiments, the user device, third-party meeting system may be directly connected to the server 120 through a separate link (not shown in FIG. 1). In certain embodiments, the server 120 may be configured to operate as a front-end device configured to provide access to the meeting analytic system consistent with certain disclosed embodiments. The server may, in some embodiments, host one or more meeting analytic system to process time-series data streamed from the user device, meeting capturing device, or the third-party meeting system in order to train a predictive model, perform continual training of a predictive model, deploy the predictive model, and implement the predictive model for generating meeting score and/or recommendations. The server may, in some cases, generate meeting surveys based on real-time calendar metadata and collect user feedback for assessing the meeting effectiveness. The server may also be configured to store, search, retrieve, and/or analyze data and information stored in one or more of the databases. The data and information may include raw data collected from the user device, meeting capturing device, as well as meeting profile data, data about a predictive model (e.g., parameters, model architecture, training dataset, performance metrics, threshold, etc), data generated by a predictive model such as meeting score or recommendations, feedback survey, user provided information such user feedback about a meeting, calendar metadata and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device and/or meeting capturing device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, third-party meeting system 130, server 120, meeting analytic system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof User device 101-1, 101-2, third-party meeting system 130, server 120, or meeting analytic system 121, may be connected or interconnected to one or more database 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the meeting data (e.g., audio/video data, chat messages, etc) meeting profile data, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the meeting analytic system 121 may provide customized algorithms to extract, transform, and load (ETL) the data. In some embodiments, the meeting analytic system 121 may construct the databases using proprietary database architecture or data structures to provide an efficient database model that is adapted to large scale databases, is easily scalable, is efficient in query and data retrieval, or has reduced memory requirements in comparison to using other data structures.

In one embodiment, the databases may comprise storage containing a variety of data consistent with disclosed embodiments. The databases may store, for example, raw data collected from the user device, meeting capturing device, as well as meeting profile data (size and composition of a meeting such as number of participants/attendees, roles of participants in the meeting, meeting duration, meeting location, meeting keywords, meeting deliverables or a meeting agenda, etc), data about a predictive model (e.g., parameters, model architecture, training dataset, performance metrics, threshold, etc), data generated by a predictive model such as meeting score or recommendations, meeting statistics, feedback survey, user provided information such user feedback about a meeting, calendar metadata and the like. In certain embodiments, one or more of the databases may be co-located with the server, may be co-located with one another on the network, or may be located separately from other devices. One of ordinary skill will recognize that the disclosed embodiments are not limited to the configuration and/or arrangement of the database(s).

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

A server 120 may access and execute the meeting analytic system 121 to perform one or more processes consistent with the disclosed embodiments. In certain configurations, the meeting analytic system may be software stored in memory accessible by a server (e.g., in memory local to the server or remote memory accessible over a communication link, such as the network). Thus, in certain aspects, the meeting analytic system(s) may be implemented as one or more computers, as software stored on a memory device accessible by the server, or a combination thereof. For example, one meeting analytic system(s) may be a computer executing one or more algorithms for pre-training a predictive model, and another meeting analytic system may be software that, when executed by a server, generating meeting score or recommendations using the trained predictive model.

The meeting analytic system 121 though is shown to be hosted on the server 120. The meeting analytic system 121 may be implemented as a hardware accelerator, software executable by a processor and various others. In some embodiments, the meeting analytic system 121 may employ an edge intelligence paradigm that data processing and prediction is performed at the edge or edge gateway. In some cases, a predictive model for generating a meeting score and/or recommendations may be built, developed and trained on the cloud/data center 120 and run on the user device and/or other devices local to the meeting (e.g., hardware accelerator) for inference. For example, the predictive model for generating a meeting score and/or recommendations may be pre-trained on the cloud and transmitted to the user device or third-party meeting system for implementation. In some cases, the predictive model may go through continual training as new meeting data and user feedback are collected. The continual training may be performed on the cloud or on the server 120. In some cases, meeting data may be transmitted to the remote server 120 which are used to update the model for continual training and the updated model (e.g., parameters of the model that are updated) may be downloaded to the physical system (e.g., user device, software application of the meeting system, third-party meeting system) for implementation.

In some cases, at least a portion of data processing can be performed at the edge (i.e., user device). In some cases, the predictive model for meeting effectiveness assessment and recommendation may be built, developed, trained, improved, maintained on the cloud, and run on the edge device or client terminal (e.g., hardware accelerator) for inference. Alternatively or in addition to, meeting data collected at the edge device or client terminal may be pre-processed locally before sending to the cloud. For example, the client terminal or user application may comprise a data processing module to provide functions such as ingesting of data streams (e.g., audio/video streams, chat messages, etc) into a local storage repository (e.g., local time-series database), data cleansing, data enrichment (e.g., decorating data with metadata), data alignment, data annotation, data tagging, or data aggregation. The pre-processed meeting data may then be transmitted to the server 120 for training or updating a model. In some cases, the client terminal may also be configured to aggregate the raw data across a time duration (e.g., about 1, 2, 3, 4, 5, 6, 7, 8, 9, 10 seconds, about 1, 2, 3, 4, 5, 6, 7, 8, 9, 10 minutes, about 1, 2, 3, 4, 5, 6, 7, 8, 9, 10 hours, etc), across data types (e.g., audio data, video data, user input, image data, etc) or sources and sent to a remote entity (e.g., third-party meeting system server, etc) as a package.

In some cases, suitable data processing techniques such as voice recognition, facial recognition, natural language processing, sentiment analysis and the like may be employed to pre-process the meeting data and user feedback data. For example, sentiment analysis may be applied to chat messages which utilizes a trained model to identify and extract opinions within a given chat message. The abovementioned data processing may be performed on the user device or on the server 120. The processed meeting data and user feedback data may be used to generate the input feature vector to the trained predictive model.

The various functions performed by the client terminal and/or the meeting analytic system such as data processing, training a predictive model, executing a trained model, continual training a predictive model and the like may be implemented in software, hardware, firmware, embedded hardware, standalone hardware, application specific-hardware, or any combination of these. The meeting analytic system, edge computing platform, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

Figure 2:
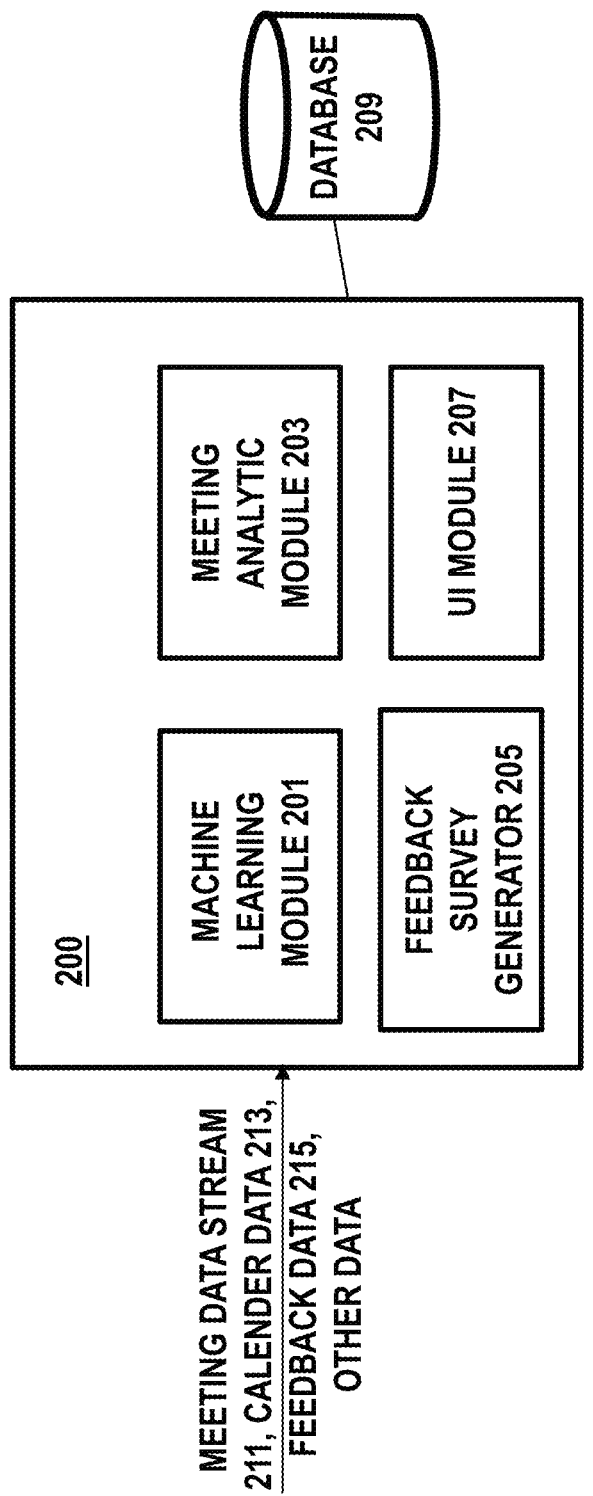
FIG. 2 schematically shows a block diagram of a system configured to generate meeting effectiveness metrics and recommendations, in accordance with various embodiments of the invention.

FIG. 2 schematically shows a block diagram of a system 200 configured to generate meeting effectiveness metrics and recommendations, in accordance with various embodiments of the invention. In some embodiments, the system 200 may comprise a machine learning module 201, a meeting analytic module 203, a feedback survey generator 205, and a user interface module 207. The system 200 may be the same as the meeting analytic system as described in FIG. 1. The system 200 may employ machine learning algorithms to provide quantitative and qualitative assessment of meeting effectiveness.

In some embodiments, the machine learning module 201 may be configured to train one or more predictive models. The one or more predictive models may be capable of generating meeting effectiveness metrics and/or recommendations based at least in part on meeting data streams 211. In some cases, the input data to the one or more predictive models may comprise meeting data streams 211 and user feedback data 215. The output of the predictive model may be a meeting score and/or recommendations as described above.

The machine learning algorithm can be any type of machine learning network such as a neural network. Examples of neural networks include a deep neural network, a convolutional neural network (CNN), and a recurrent neural network (RNN). The machine learning algorithm may comprise one or more of the following: a support vector machine (SVM), a naive Bayes classification, a linear regression model, a quantile regression model, a logistic regression model, a random forest, a neural network, CNN, RNN, a gradient-boosted classifier or repressor, or another supervised or unsupervised machine learning algorithm (e.g., generative adversarial network (GAN), Cycle-GAN, etc).

The machine learning module 201 may be capable of providing a personalized predictive model for a meeting or a type of meeting (e.g., telework, telecommuting, face-to-face, virtual meeting, etc), to generate a meeting score or recommendations by processing meeting data and user feedback data. The predictive model may be continually trained and improved using proprietary data or relevant data (e.g., user feedback data, meeting data collected from meetings with common characteristics) so that the output can be better adapted to the specific meeting or type of meeting. In some cases, a predictive model may be pre-trained and implemented on the physical meeting system, and the pre-trained model may undergo continual re-training that involves continual tuning of the predictive model or a component of the predictive model (e.g., classifier) to adapt to changes in the implementation environment over time (e.g., changes in the physical meeting system, model performance, user-specific data, etc). The continual training process may require user feedback data. In some embodiments, the user feedback data may be collected in response to a personalized feedback survey generated by the feedback survey generator 205. Alternatively or additionally, the user feedback data may be used in the pre-training phase.

In some cases, the one or more predictive models may not be further changed after the model is deployed. In such cases, a fixed model may be executed and used for generating meeting score and/or recommendations in implementation. Alternatively, the one or more predictive models may go through a training stage, an adaptation stage and/or an optimization stage. The adaptation stage and/or optimization stage may beneficially provide meeting-specific or participants-specific adaptation of the model.

The training method may include supervised learning, semi-supervised learning or unsupervised learning. For example, the training method may involve pre-training one or more components of the predictive model, the adaptation stage may involve training the predictive model to adapt to a physical meeting system in which the pre-trained model is implemented, and the optimization stage may involve further continual tuning of the predictive model or a component of the predictive model (e.g., classifier) to adapt to changes in the implementation environment over time (e.g., changes in the physical meeting system, model performance, meeting-specific data, etc). In some cases, one or more of the multiple stages (e.g., pre-training stage, optimization stage) may require user feedback (e.g., user feedback in response to a personalized survey).

In some cases, the model network for generating a meeting score and/or recommendations may be obtained using supervised learning methods that require labeled datasets. In some cases, labeled datasets (e.g., meeting score, recommendation) may be retrieved from a database, external data sources, or provided by one or more users. In some cases, the labeled data may be provided by experts (e.g., psychologists and behavioral scientists) or calculated based on existing meeting data using a known formula. The training dataset may comprise meeting data such as audio data, video data, chat messages, user feedback and the abovementioned labeled dataset.

In some cases, the input data to the predictive model may be raw meeting data (e.g., raw audio data stream, video stream) and user feedback data. In some cases, the input data may be pre-processed data. Suitable data processing techniques such as voice recognition, facial recognition, natural language processing, sentiment analysis and the like may be employed to pre-process the meeting data and user feedback data. For example, sentiment analysis that utilizes a trained model to identify and extract opinions within a given chat message may be applied. The pre-processed meeting data and user feedback data may be used to generate the input feature vector to the predictive model.

The model network for pre-processing the meeting data may employ supervised learning, semi-supervised learning or un-supervised learning techniques. For example, the model network for pre-processing the input data (e.g., audio data and video data) for feature extraction may comprise an autoencoder. During the feature extraction operation, the autoencoder may be used to learn a representation of the input data for dimensionality reduction or feature learning. The autoencoder can have any suitable architecture such as a classical neural network model (e.g., sparse autoencoder, denoising autoencoder, contractive autoencoder) or variational autoencoder (e.g., Generative Adversarial Networks). In some embodiments, a sparse autoencoder with an RNN (recurrent neural network) architecture, such as LSTM (long-short-term memory) network, may be trained to regenerate the inputs for dimensionality reduction. For example, an encoder-decoder LSTM model with encoder and decoder layers may be used to recreate a low-dimensional representation of the input data to the following model training despite a latent/hidden layer.

In some cases, the process of training a predictive model may comprise extracting unsupervised features from meeting data streams (e.g., time-series data, audio data, video data, chat messages). The input data for training the predictive model can be two-dimensional array or high-dimensional depending on the structure of the classifier. In some embodiments, the time-series data may not include labeled dataset.

In some cases, the extracted features and the output of the autoencoder (e.g., low-dimensional representation of the input data) may be used for training one or more classifiers for generating the meeting score or the recommendations. The classifiers can be of any suitable type, including but not limited to, KNN (k-nearest neighbor), support vector machine (SVM), a naive Bayes classification, a random forest, decision tree models, convolutional neural network (CNN), feedforward neural network, radial basis function network, recurrent neural network (RNN), deep residual learning network and the like. As described above, the one or more classifiers may be trained using supervised learning techniques.

In some cases, the predictive model may be further optimized to better adapt to the physical meeting system or participants-specific data. For example, the autoencoder and/or classifier may be further tuned as new meeting data and/or user feedback data are collected. This continual learning approach may beneficially improve the model performance over time and improve the model's adaptability to changes in the physical meeting system, meeting characteristics or other variables over time.

The meeting analytic module 203 may be used for generating a meeting score and/or recommendations based on meeting data streams 211 and/or user feedback data 215. The meeting analytic module 203 may execute one or more trained predictive models as described above to process input data collected from the user device, meeting capturing device and/or the third-party meeting system. As described above, the recommendations may comprise information about changing one or more meeting characteristics as described above. For example, the recommendation may comprise a recommended size of meeting, composition of a meeting (e.g., number of participants/attendees, roles of participants in the meeting), meeting duration, meeting location, meeting keywords, meeting deliverables or a meeting agenda or other recommendations that may influence the meeting effectiveness or meeting score. In some cases, the recommendation may include a comparison between a current meeting effectiveness and that of an ideal meeting (e.g., a diagram shows the comparison of effectiveness between the current meeting and ideal meeting). In some cases, the recommendations may be customized using a personalized trained model as described elsewhere herein such that the one or more actions as recommended are executable in the physical system.

The feedback survey generator 205 may be configured to generate one or more surveys or questionnaires based on calendar data 213. In some cases, one or more surveys may be generated for each meeting. The one or more surveys may be generated before, during or after a meeting is conducted.

The content of the surveys and the timing of delivering the surveys may be based at least in part on the calendar data 213. In some cases, the calendar data 214 may comprise calendar metadata. The calendar metadata may comprise a plurality of metadata attributes for a meeting such as meeting duration (e.g., time in minutes), meeting start/end time, meeting location, meeting type, event type, attendees, or others. The calendar metadata may be used to determine when to deliver a meeting survey to a participant (e.g., 1 hour after meeting end time, etc.). The calendar metadata may be used to determine the content of a feedback survey. For example, based on the event type (e.g., conferences, seminars, workshops, symposiums, group discussion, etc), survey questions may be generated.

In optional cases, the content of a post-meeting survey may be determined based on meeting metadata and/or a meeting data stream. For example, meeting metadata that is associated with the participants (e.g., participant name, IP address, dial-in number, etc.) and/or metadata associated with the meeting (e.g., meeting location, name, calendaring meeting time, etc.) may be extracted by processing the meeting data and used to generate the surveys. In some cases, the surveys may be generated based on one or more effectiveness measurements such as distribution of speaking time (e.g., the percentage of speaking time amongst the plurality of participants calculated in real-time, and/or a duration of speaking time for each participant), occurrence of interruption of the meeting and other measurements as described elsewhere herein. Examples of the surveys and meeting analytics are described later (e.g., FIG. 4, FIG. 5A and FIG. 5B).

The feedback survey delivered to the participants that attended the same meeting may be the same. Alternatively, the feedback survey delivered to the participants that attended the same meeting may be different based on the role of the participants in the meeting (e.g., featured speaker, attendee, etc.). The feedback survey generated for different meetings may be different. Alternatively or additionally, a feedback survey generated for meetings that share a common meeting characteristic (e.g., meeting type, location, meeting composition, etc.) may be the same. In some cases, the feedback survey may be delivered to a participant via a graphical user interface. Examples of the personalized surveys are described later herein.

The user interface (UI) module 207 may be configured for representing and delivering meeting analytics (e.g., meeting score, meeting statistics), recommendations, and personalized meeting surveys. The user interface (UI) module 207 may provide a graphical user interface (GUI) that can be integrated into other applications, or via any suitable communication channels (e.g., email, Slack, SMS) for presenting the feedback survey, meeting effectiveness assessment and/or recommendation. A user may provide user feedback via the GUI. For example, the user feedback may be provided via the graphical user interface (GUI), webhooks that can be integrated into other applications, or via any suitable communication channels (e.g., email, Slack, SMS). In some embodiments, the user feedback may be provided via a user interface (UI). The UI may include a UI for representing feedback survey generated by the feedback survey generator 205 to the user and receiving user input from a user (e.g., through user device). The user interface may comprise using of one or more user interactive device (e.g., mouse, joystick, keyboard, trackball, touchpad, button, verbal commands, gesture-recognition, attitude sensor, thermal sensor, touch-capacitive sensors, AR or VR devices). In some cases, the UI may comprise a GUI for displaying feedback survey and receiving user feedback, and a separate GUI for users to view meeting effectiveness assessment and/or recommendation generated by the meeting analytic system.

In some embodiments, the GUIs may be rendered on a display screen on a user device (e.g., a participant device). The user interfaces and functionality described herein may be provided by software executing on the user's computing device, by a meeting system or the meeting analytic system located remotely that is in communication with the computing device via one or more networks, and/or some combination of software executing on the computing device and the meeting analytic system. The user interfaces may be provided by a cloud computing system.

One or more of the multiple components may be coupled to a database 209. The database can be the same as the database 111, 123 as described in FIG. 1.

FIG. 3 shows an example of a method 300 for providing a meeting effectiveness assessment and corresponding recommendations. The system 200 of FIG. 2 can perform the method 300. In some cases, calendar metadata and meeting data streams (e.g., audio data, video data, chat messages, etc.) may be received and analyzed for generating a personalized feedback survey (operations 301, 303). In some embodiments, the calendar metadata and meeting data streams may also be processed to generate real-time meeting effectiveness metrics while a meeting is ongoing. The real-time meeting effectiveness metrics may include, for example, the amount of time remaining in the meeting, the distribution of speaking time across individual speakers in a meeting (e.g., in percentage and/or in hours, minutes, or seconds), the order in which the participants have indicated they'd like to speak, participation of each participant (e.g., whether a participant has spoken or has spoken more or less than a threshold of time length of time), occurrence of an interruption and various other live measurements.

The one or more real-time meeting effectiveness metrics may be generated using suitable methods or models. For example, the occurrence of an interruption may be identified when two or more participants are detected to be speaking simultaneously for longer than a threshold of seconds. In some cases, the system can generate one or more real-time meeting effectiveness metrics by applying deep learning techniques to the audio stream or video stream of the meeting. The one or more real-time meeting effectiveness metrics may be generated using the metadata associated with the participants (e.g., participant name, IP address, dial-in number, etc.) and/or metadata associated with the meeting (e.g., meeting location, name, calendaring meeting time, etc.).

In some cases, the system displays at least a portion of the live effectiveness metrics to the participants in real-time during the meeting. One or more visual indicators of the live effectiveness metrics may be displayed in a graphical user interface (GUI) integrated into a third-party meeting software. For example, users may be provided with additional views within meeting software to visualize the meeting effectiveness measurements during the meeting. The visual indicators may be presented with an existing video conferencing GUI such as in a separate side bar/panel without modifying the original video conferencing user interface. Alternatively or in addition to, the visual indicators may be incorporated into the video conferencing GUI and form a new graphical representation of the video conferencing software such that the graphical representation of the participants in the meeting are rearranged according to the real-time meeting effectiveness measurements.

Figure 8:
FIG. 8 shows an example of visual indicators of live meeting effectiveness measurements displayed on a graphical user interface (GUI).

FIG. 8 shows an example of visual indicators 801 of the live meeting effectiveness measurements on a graphical user interface (GUI) 800. The visual indicators 801 may be displayed to augment a view 801 within the meeting software. As shown in the example, the visual indicator may comprise a map showing the participation analytics amongst a plurality of participants. The map may show the real-time distribution of speaking time among the participants in an on-going meeting. The distribution of speaking time may include, for example, the percentage of speaking time amongst the plurality of participants calculated in real-time, and/or a duration of speaking time for each participant (e.g., in minutes, seconds, etc.). The distribution of speaking time may be shown in any suitable format, such as a map, pie chart, diagram, plot, and/or animation. The visual indicators may also include the remaining time 805 of the meeting which is estimated based at least in part on the calendar data. The visual indicators may include any other real-time meeting effectiveness measurements such as the occurrence of an interruption (if any interruption has been detected), the order of participants who are going to speak, and various others.

Figure 9:
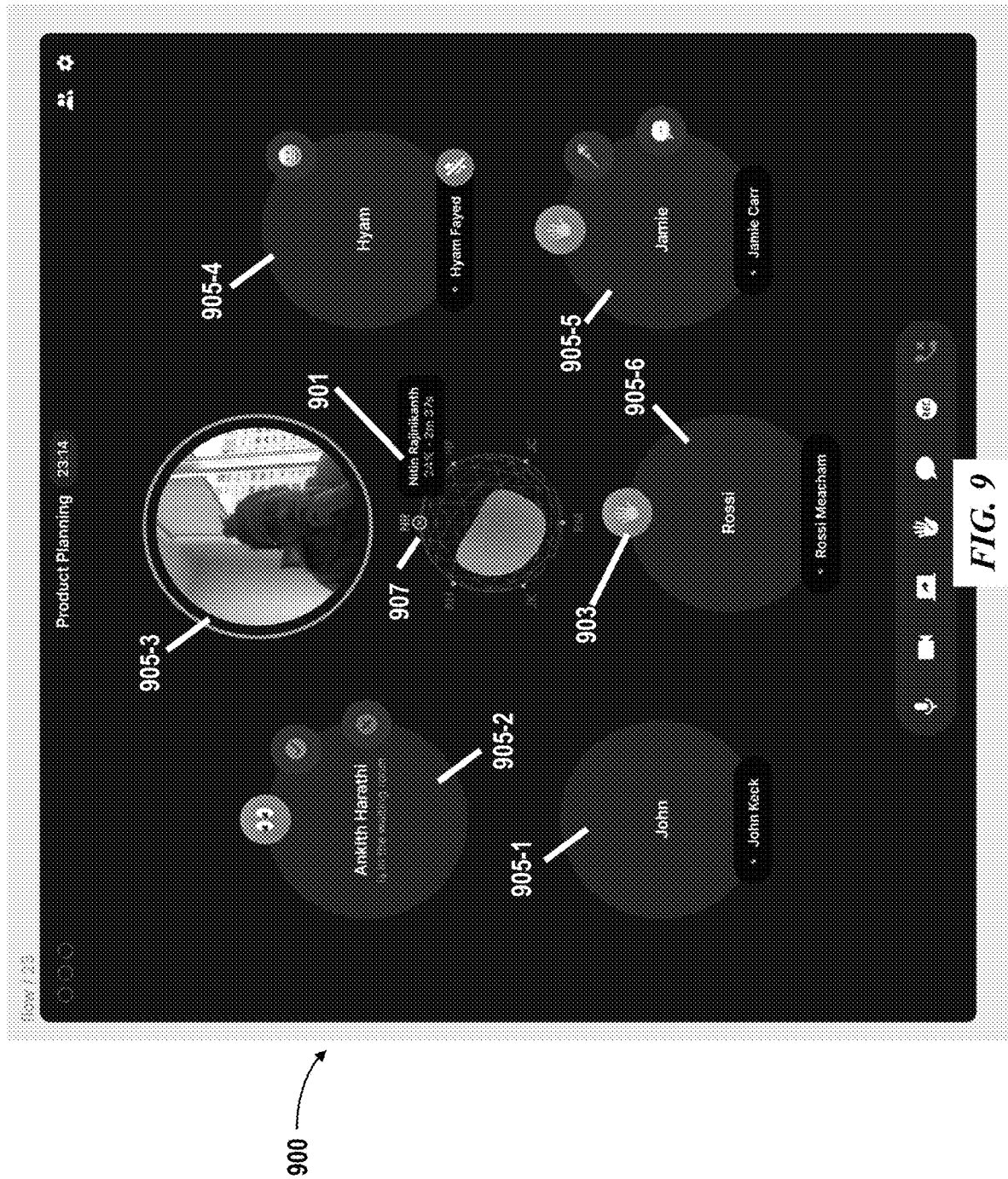
FIG. 9 shows a second example of visual indicators as displayed in a GUI.

FIG. 9 shows another example 900 of visual indicators 901, 903 of the live meeting effectiveness measurements. In some cases, a user may be permitted to switch between different formats 800, 900 for viewing the real-time visual indicators. For example, a user may be provided with a more detailed map of the real-time meeting analytics. The participants of the meeting 905-1, 905-2, 905-3, 905-4, 905-5, 905-6 may be visually rearranged corresponding to the map 901 such that the distribution of speaking time among the participants can be visualized in an easy and intuitive manner. For example, the participants 907 may be depicted in the map along with the metadata (e.g., name) and effectiveness measurements (e.g., speaking time), and the displayed participant icons (e.g., participant 905-4) of the conference may be arranged in close proximity to the depicted participants (e.g., NR 907) in the map, such that the viewing participants appreciate and associate the effectiveness measurements with the appropriate participants. As shown in the example, the order 903 in which the participants have indicated they'd like to speak may also be displayed on the GUI.

Referring again to FIG. 3, the feedback survey may be generated based at least in part on calendar metadata. The feedback survey may be generated in response to receiving a request for performing a meeting effectiveness assessment. The feedback survey may then be delivered to one or more participants of the respective meeting for collecting user feedback. The user feedback data and meeting data stream may be processed to calculate a meeting score 305. The meeting score may be calculated using a trained model or machine learning algorithm as described elsewhere herein. In some cases, the trained model may be selected from a plurality of predictive models based on one or more meeting characteristics (e.g., type of meeting, meeting composition, meeting size, etc). In some cases, in response to receiving a request for meeting recommendations (operation 307), recommendations may be generated using a predictive model (operation 309) as described elsewhere herein. Alternatively or additionally, the meeting recommendation may be generated currently with the meeting score, and displayed to a user in response to receiving a request for viewing the recommendations.

For example, the operations can be performed in any order. Some of the operations may be precluded, some of the operations may be performed concurrently in one step, some of the operations may be repeated, and some of the operations may comprise sub-steps of other operations. For example, meeting data for generating a personalized feedback survey can be optional that the meeting data may only be used for calculating a meeting score and/or recommendations. In another example, the meeting score may be calculated without using the user feedback data or without collecting user feedback from all of the participants. The method may also be modified in accordance with other aspects of the disclosure as provided herein.

User feedback can be involved in various steps or stages of the method. In some cases, user feedback may be used before classifiers are trained. For instance, before training the classifiers, user feedback may be used to generate labeled data. Alternatively or in addition to, user feedback may be used after the predictive model is deployed and used for continual training of the model and/or for making inferences.

Figure 4:
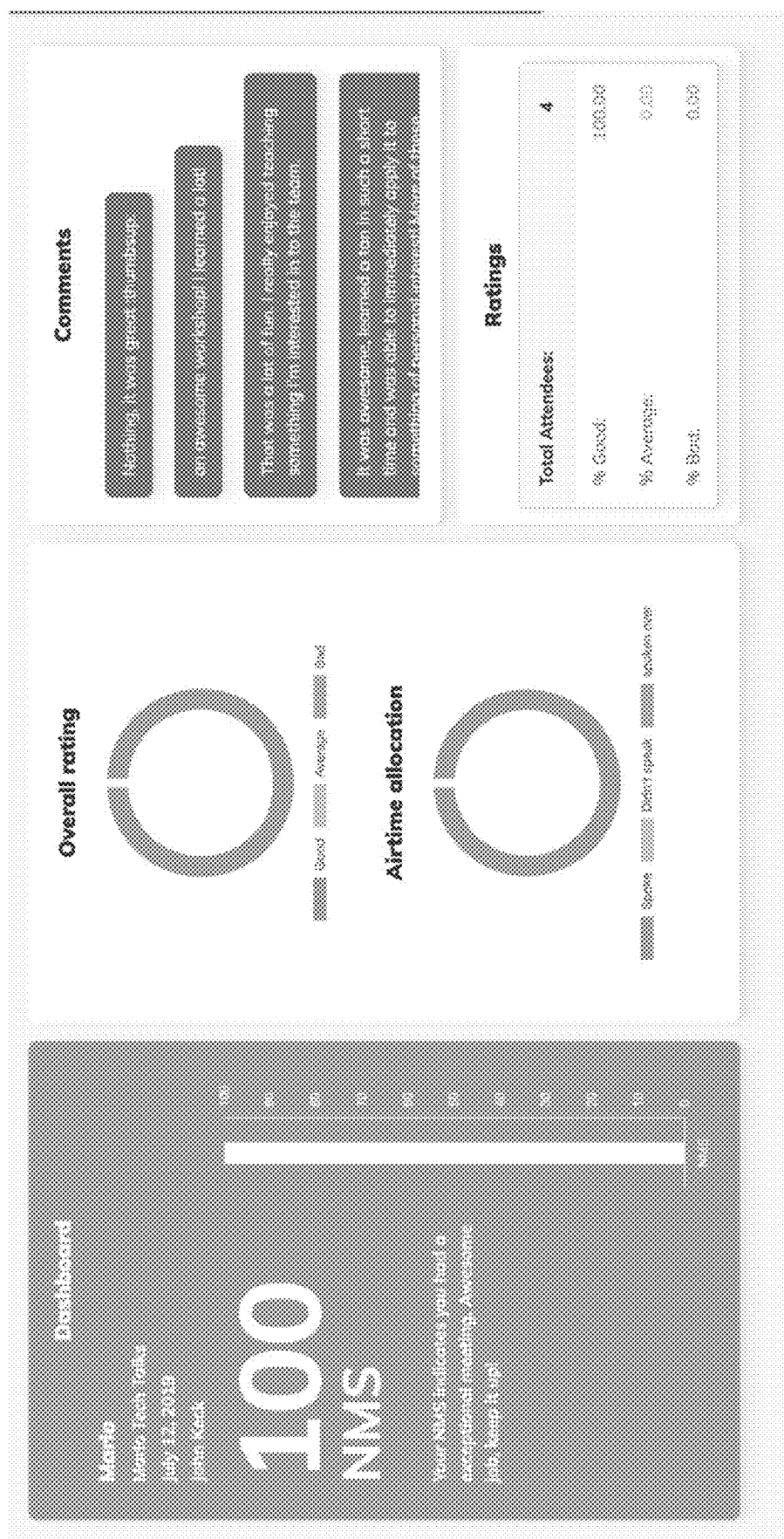
FIG. 4 shows an example of a graphical user interface (GUI) for presenting meeting analytic result.

FIG. 4 shows an example of a GUI for presenting meeting analytic result. The GUI may be rendered on a user device. In the illustrated example, a meeting score in the scale of 0 to 100 is displayed in a dashboard region within the GUI. In some cases, statistics about the meeting such as airtime allocation and overall rating may be displayed. In some cases, user feedback may be displayed in the form of comments. The statistics may be associated with a meeting and/or a participant. For example, the airtime allocation may be averaged over all the participants of the meeting. Alternatively or in addition to, the airtime allocation time may be associated with a specific participant. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. The GUI may enable a user to interact with systems of the disclosure, such as for visualizing a meeting score and/or meeting statistics.

Figure 5A:
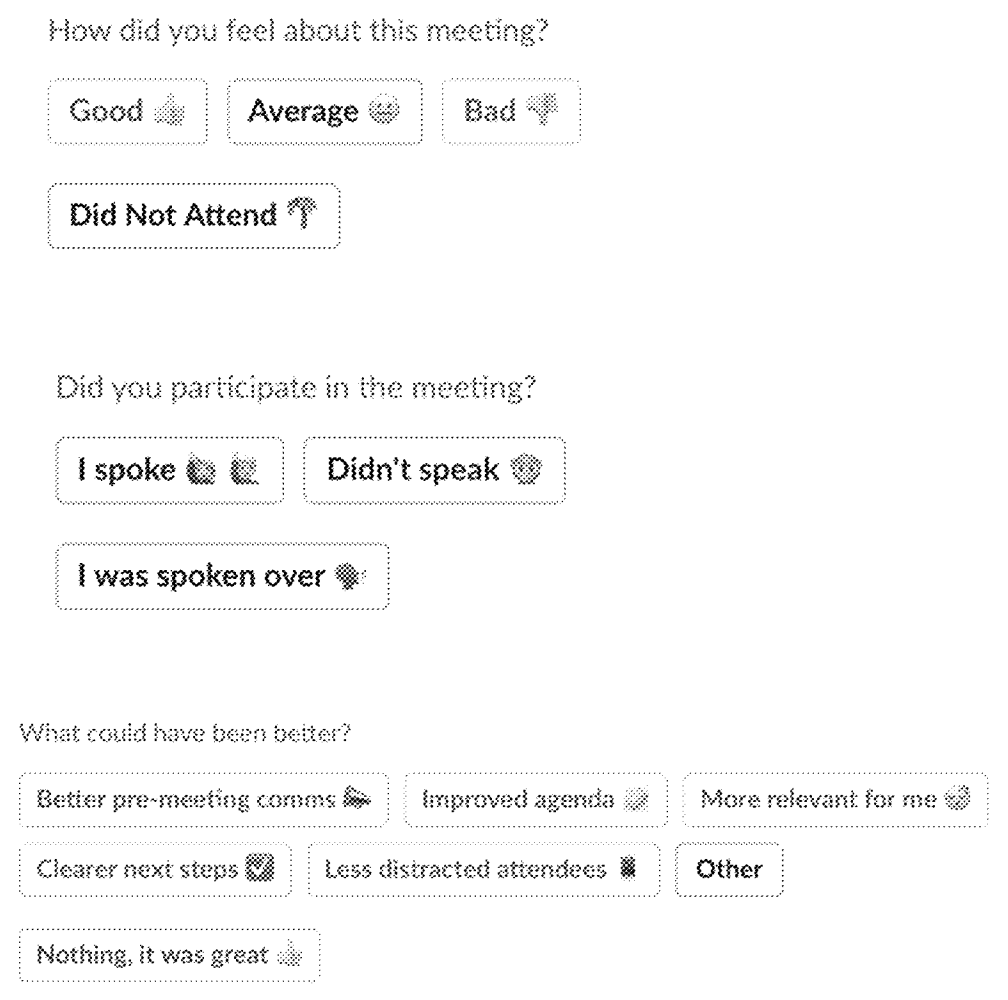
Figure 5B:
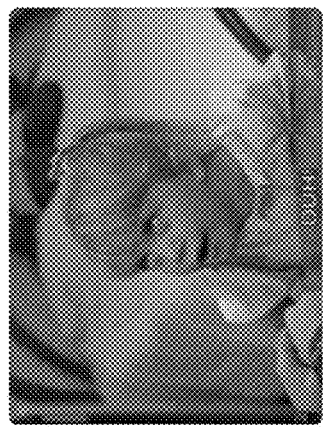

FIG. 5A and FIG. 5B show examples of GUIs for presenting a feedback survey and receiving user feedback. The GUI may be rendered on a user device. A user may receive a feedback survey about a meeting within the GUI. The feedback survey may be displayed after a meeting is conducted. In the illustrated example, a user may be prompted to select from a set of pre-determined options via the GUI for each question. The user may provide input (e.g., select an option) by directly touching the screen (e.g., touchscreen) or click an answer. A user may also be permitted to view other users' response to the user feedback or other users' feedback about the meeting. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. The GUI may enable a user to interact with systems of the disclosure, such as for visualizing a personalized feedback survey and providing user feedback about the meeting. As described above, the content of the survey may be personalized. The survey may include one or more questions asking the user for input. For example, the survey may ask the general "feeling about the meeting," whether the user actively participated in the meeting, what could have been better about the meeting. In some cases, the questions presented to a user may be personalized. In some cases, the options for the user to select in response to a question may be personalized by the system. For instance, a user may be presented with a plurality of options to select (e.g., "I did not need to be there"; "better agenda prep"; "clearer next step"; "not enough voices heard") as shown in FIG. 5B. Such options may be dynamically generated based on the meeting data and calendar data. For example, if the meeting analytics indicates a poor airtime allocation, an option of "not enough voices heard" may be presented.

FIG. 6 shows another example of GUI for a user to provide user feedback. A user may be permitted to type in a feedback without being restricted to a pre-determined set of options. In some cases, the user feedback may be processed using suitable techniques such as linguistic analysis or natural language processing before being used to generate a meeting score.

Computer systems

Figure 7:
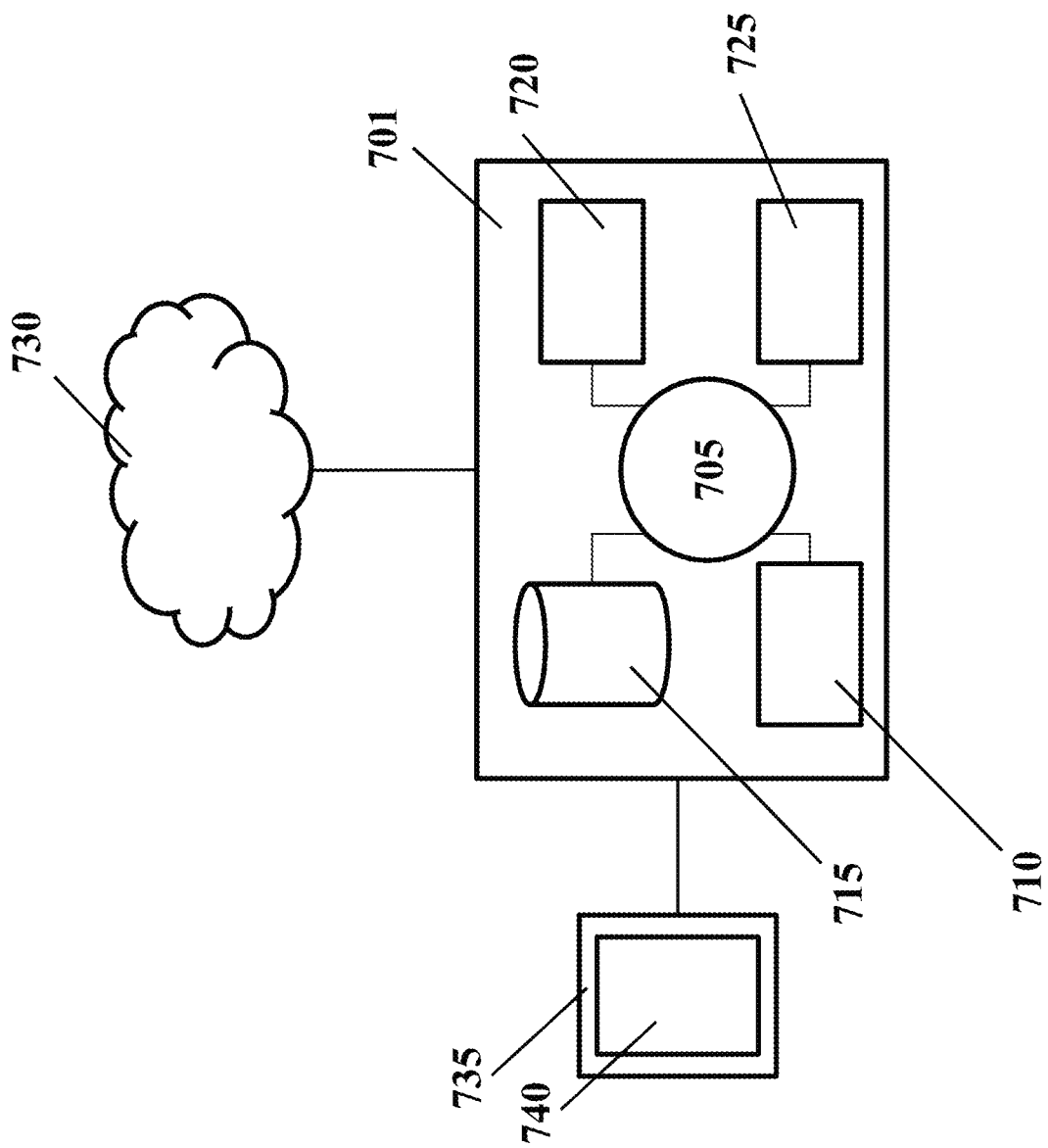
FIG. 7 shows a computer system that is programmed or otherwise configured to implement the meeting analytic system.

The meeting analytic system or processes described herein can be implemented by one or more processors. In some embodiments, the processor may be a processing unit of a computer system. FIG. 7 shows a computer system 701 that is programmed or otherwise configured to implement the meeting analytic system. The computer system 701 can regulate various aspects of the present disclosure. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., a user device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 1035 that comprises a user interface (UI) 740 for providing, for example, a graphical user interface as described elsewhere herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, trained models such as meeting effectiveness quantification algorithm, machine learning algorithm, natural language processing module, or sentimental analysis module.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for quantifying meeting effectiveness comprising:
    receiving calendar data and meeting data associated with a meeting on a video conferencing application, wherein said meeting comprises a plurality of participants;
    generating, using a trained machine learning algorithm, a meeting score indicative of real-time meeting effectiveness data of said meeting based on user feedback data and on said meeting data or said calendar data;
    arranging a plurality of graphical representations of the plurality of participants onto a graphical user interface (GUI) of the video conferencing application;
    modifying the GUI of said video conferencing application by displaying one or more visual indicators of said real-time meeting effectiveness data in said GUI, wherein said modified GUI and said one or more visual indicators are rendered on a display of a user device associated with each of said plurality of participants; and
    during said meeting, continuously updating said one or more visual indicators to reflect updated real-time meeting effectiveness data based on new meeting data and new calendar data and displaying a recommendation for improving the meeting score within said GUI, wherein the graphical representations of the plurality of participants are rearranged according to the updated real-time meeting effectiveness data.

2. The method of claim 1, wherein said calendar data comprises calendar metadata.

3. The method of claim 2, wherein said calendar metadata comprises a meeting duration, meeting start/end time, meeting location, meeting type, event type, or attendees.

4. The method of claim 1, further comprising generating a feedback survey based on said calendar data for collecting the user feedback data, wherein said feedback survey is presented to one or more of said plurality of participants and wherein a content of said feedback survey or a timing of presenting said feedback survey on the user device is determined based on said calendar metadata.

5. The method of claim 1, wherein said meeting data comprises audio data, video data or chat messages.

6. The method of claim 4, wherein said user feedback data is provided by said one or more of said plurality of participants via said GUI on said electronic device.

7. The method of claim 1, wherein said recommendation is generated using a trained machine learning algorithm.

8. The method of claim 1, wherein said recommendation comprises a recommended meeting size, recommended meeting attendees, a recommended meeting duration, a recommended meeting location, recommended meeting keywords, recommended meeting deliverables, or a recommended meeting agenda.

9. The method of claim 1, wherein the updated real-time meeting effectiveness data is also based on a distribution of speaking time among said plurality of participants of said meeting.

10. The method of claim 1, wherein the updated real-time meeting effectiveness data is also based on an indication of an interruption of speaking during said meeting.

11. The method of claim 1, wherein the updated real-time meeting effectiveness data is also based on a remaining time of said meeting.

12. The method of claim 11, wherein said remaining time of said meeting is estimated based at least in part on said calendar data.

13. A system for quantifying meeting effectiveness, said system comprising a computer comprising one or more computer processors that are individually or collectively programmed to:
   receive calendar data and meeting data associated with a meeting on a video conferencing application, wherein said meeting comprises a plurality of participants;
   generate, using a machine learning algorithm trained model, a meeting score indicative of real-time meeting effectiveness data of said meeting based on user feedback data and on said meeting data or said calendar data;
   arrange a plurality of graphical representations of the plurality of participants onto a graphical user interface (GUI) of the video conferencing application;
   modify the GUI of said video conferencing application by displaying one or more visual indicators of said real-time meeting effectiveness data in said GUI, wherein said modified GUI and said one or more visual indicators are rendered on a display of a user device associated with each of said plurality of participants; and
   during said meeting, continuously update said one or more visual indicators to reflect updated real-time meeting effectiveness data based on new meeting data and new calendar data and displaying a recommendation for improving the meeting score within said GUI, wherein the graphical representations of the plurality of participants are rearranged according to the updated real-time meeting effectiveness data.

14. The system of claim 13, wherein said calendar data comprises calendar metadata.

15. The system of claim 13, wherein said computer is further programmed to generate a feedback survey based on said calendar data for collecting the user feedback data, wherein said feedback survey is presented to one or more participants in said meeting and wherein a timing of presenting said feedback survey on the user device is determined based on said calendar metadata.

16. The system of claim 15, wherein said recommendation comprises a recommended meeting size, recommended meeting attendees, a recommended meeting duration, a recommended meeting location, recommended meeting keywords, recommended meeting deliverables, or a recommended meeting agenda.

17. The system of claim 13, wherein the updated real-time meeting effectiveness data is also based on a distribution of speaking time among said plurality of participants of said meeting.

18. The system of claim 13, wherein the updated real-time meeting effectiveness data is also based on an indication of a remaining time of said meeting and wherein said remaining time of said meeting is estimated based at least in part on said calendar data.

19. A non-transitory computer-readable medium comprising machine-executable instructions that, upon execution by one or more computer processors, implements a method for visualizing digital content of a web-based application, said method comprising:
   receiving calendar data and meeting data associated with a meeting on a video conferencing application, wherein said meeting comprises a plurality of participants;
   generating, using a machine learning algorithm trained model, a meeting score indicative of real-time meeting effectiveness data of said meeting based on user feedback data and on said meeting data or said calendar data;
   arranging a plurality of graphical representations of the plurality of participants onto a graphical user interface (GUI) of the video conferencing application;
   modifying a the GUI of said video conferencing application by displaying one or more visual indicators of said real-time meeting effectiveness data in said GUI, wherein said modified GUI and said one or more visual indicators are rendered on a display of a user device associated with each of said plurality of participants of said meeting; and
   during said meeting, continuously updating said one or more visual indicators to reflect updated real-time meeting effectiveness data based on new meeting data and new calendar data and displaying a recommendation for improving the meeting score within said GUI, wherein the graphical representations of the plurality of participants are rearranged according to the updated real-time meeting effectiveness data.

20. The method of claim 1, wherein the updated real-time meeting effectiveness data is also based on an order in which one or more of said plurality of participants will speak.

21. The system of claim 13, wherein the updated real-time meeting effectiveness data is also based on an indication of an interruption of speaking during said meeting.

22. The non-transitory computer-readable medium of claim 19, wherein said calendar data comprises calendar metadata and wherein said calendar metadata comprises a meeting duration, meeting start/end time, meeting location, meeting type, event type, or attendees.

23. The non-transitory computer-readable medium of claim 19, wherein said method further comprises generating a feedback survey based on said calendar data for collecting the user feedback data, wherein said feedback survey is presented to one or more of said plurality of participants of said meeting.

24. The non-transitory computer-readable medium of claim 23, wherein a timing of presenting said feedback survey on the user device is determined based on said calendar metadata.

25. The non-transitory computer-readable medium of claim 19, wherein the updated real-time meeting effectiveness data is also based on a distribution of speaking time among said plurality of participants of said meeting.

* * * * *